United States Patent Office 2,916,509
Patented Dec. 8, 1959

2,916,509
PHOSPHONIC ACID DERIVATIVES

Ernst Schegk, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Application August 14, 1957
Serial No. 678,031

Claims priority, application Germany August 23, 1956

4 Claims. (Cl. 260—461)

The present invention relates to and has as its objects new phosphonic acid esters and their production. Generally the new compounds of the present invention correspond to the following formula

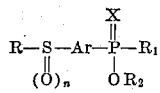

in which R and $R_1$ stand for alkyl or aryl radicals, Ar stands for aryl radicals, $R_2$ stands for lower alkyl radicals, especially containing 1 to 4 carbon atoms, X stands for oxygen or sulfur, and $n$ stands for 0 or a whole number from 1 to 2.

Some phosphonic and thiophosphonic acid esters are valuable insecticides, and the present invention relates to a new class of these compounds, which shows good results in combating a plurality of insects, thus being also able to be used as plant protecting agents.

Generally the new compounds of the present invention may be obtained by reacting phosphonic- or thiophosphonic acid halides, especially chlorides with suitable mercapto substituted phenols. This reaction may be seen from the following equations:

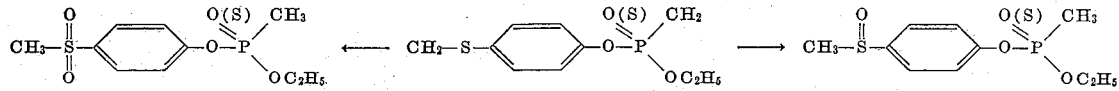

It has to be understood, however, that these equations are given by way of illustration only and that other phosphonic- and thiophosphonic acid halides as well as other substituted phenols may also effectively be used according to the present invention. Other examples of phosphonic- or thiophosphonic acid ester halides are: ethyl phosphonic acid ethyl ester chloride, propyl phosphonic acid ethyl ester chloride, phenyl phosphonic acid ethyl ester chloride, p-chlorophenyl phosphonic acid ethyl ester chloride, 3,4-dichlorophenyl phosphonic acid ethyl ester chloride, and the like. Also the corresponding thiophosphonic acid derivatives as well as other alkyl esters such as the methyl, propyl, butyl esters and the like may be used in the same way.

Other substituted phenols, which may be used according to the present invention are: o-, m- or p-phenyl mercapto phenol, o-, m- or p-propyl mercapto phenol, o-, m- or p-phenyl mercapto phenol, 2-methyl mercapto-p-cresol, 3-methyl mercapto-p-cresol, 2-ethyl mercapto-p-cresol, 3-ethyl mercapto-p-cresol, other alkyl mercapto-o- and m-cresols, 2-ethyl mercapto-p-chlorophenol, 2-methyl mercapto-p-chlorophenol, 2-phenyl mercapto-p-chlorophenol, and the like. The corresponding sulfoxides and sulfones of all of the above said mercaptanes as well as of other similar mercaptanes may also be used according to the present invention. But in case the sulfoxides or sulfones should be prepared it is also possible to oxidize the intermediate mercaptophenyl phosphonic acid esters to these sulfoxides and sulfones. This may be seen from the following equation:

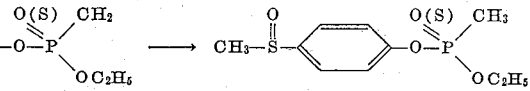

The reaction generally should be carried out either with salts of the above said phenols or in the presence of acid binding agents. Suitable salts of the phenols are especially the alkali metal salts such as the sodium or potassium salt. If the reaction is carried out in the presence of acid binding agents alkali metal alcoholates, hydroxides or

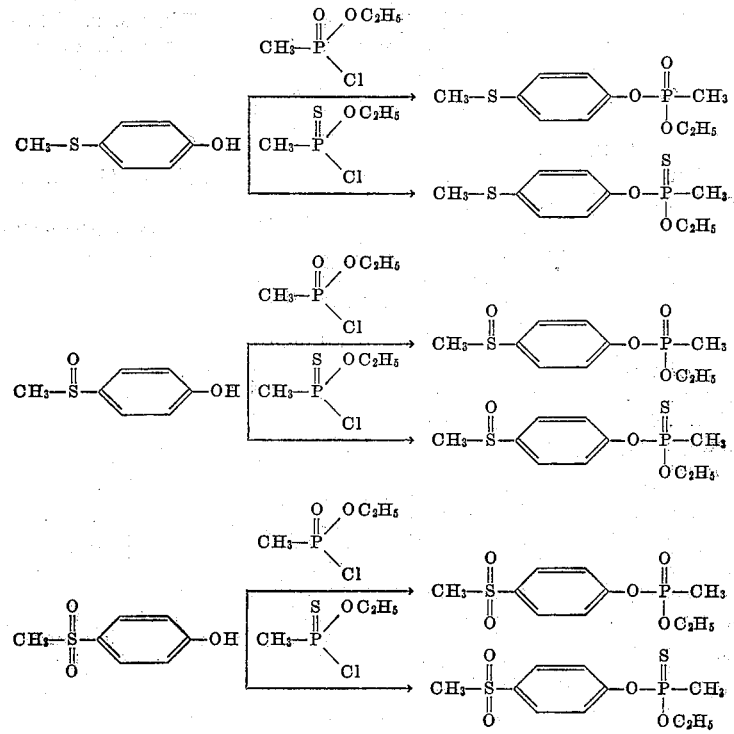

carbonates are especially suitable to complete the inventive reaction.

The temperature range within which the reaction optionally takes place is between about 0 to 100° C., but sometimes lower or higher temperatures may also be advisable. It is mostly advisable to start the reaction at lower temperatures or at room temperature and to complete it by heating on the steam bath.

For carrying out the inventive reaction the presence of inert solvents is advisable and acetone, lower alcohols such as methanol or ethanol, benzene, toluene, and the like are the most common solvents for this reaction.

The compounds of the present invention are generally valuable insecticides and plant protecting agents. They kill pests such as aphids, flies and mites and exhibit a very remarkable systemic action. A part of the inventive new phosphonic acid esters shows a remarkable activity against sucking insects such as caterpillars. The application of these compounds should be carried out according to the use of other known phosphor insecticides, i.e. in dilution or solution with solid or liquid carriers such as chalk, talk, bentonite, water, alcohols, liquid hydrocarbons etc. The inventive compounds may further be used in combination with other known insecticides or pesticides, etc. Effective concentrations of the compounds may vary also; generally, concentrations of 0.0001 to 1.0% kill pests effectively. The combinations of the compounds may be sprayed or dusted or otherwise brought in contact with pests or plants to be protected. They may also be used as aerosols.

The utility of the inventive compounds has been determined by using the phosphonic acid ester of the following formula

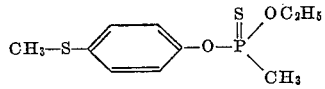

against some common known insects and plant pests.

Solutions of this ester which have been prepared by using dimethyl formamide as auxiliary solvent (in the same amount as the active ingredient), and 50% by weight of the active ingredient of a commercial emulsifier consisting of benzyl hydroxy diphenyl polyglycol ether are used against Colorado beetles, black bean aphids, spider mites, and eggs of spider mites. With aqueous dilutions of the above shown mixture in a concentration of active ingredient of 0.01%—Colorado beetles are killed 100%
0.001%—black bean aphids and spider mites are killed 100%
0.0001%—eggs of spider mites are killed 100%

The following examples are given by way of illustration only, without limiting the present invention thereto.

*Example 1*

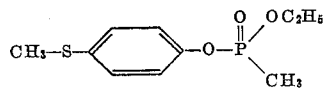

23 grams of sodium are dissolved in 150 cc. of unhydrous alcohol and 1.2 litres of benzene are added. Then 140 grams of S-methyl thiohydrochinone (M.P. 81° C.) are given to this mixture. The ethanol and part of the benzene are distilled off aceotropically to remove last traces of water. To the benzenic suspension of the sodium phenolate there are added while cooling and at a temperature of about 10° C. 170 grams of methyl phosphonic acid ethyl ester chloride (B.P.$_{.2}$ 45° C.). After completion of the reaction the mixture is warmed for another 2 hours at a temperature of 70–75° C., then it is cooled down to room temperature and the sodium chloride is filtered off with suction. The filtrate is washed three times with 20 ml. of water and then dried over sodium sulfate. After filtration and distilling off of the solvent the raw ester is distilled in high vacuo. There are obtained 176 grams of a colorless, water-unsoluble oil (B.P.$_{.0.01}$ 90° C.). Yield: 71.5% of the theoretical.

Calc. for 246.3: P=12.6%, S=13.0%. Found: P=11.6%, S=13.9%.

DL$_{95}$ on rats orally 1 mg./kg.

*Example 2*

47 grams of S-methyl thiohydrochinone sulfoxide (M.P. 107° C.) are suspended in 600 cc. of benzene. To this mixture there are added 57 grams of a sodium methylate solution containing 0.3 mol of sodium. The methanol is distilled off aceotropically with most of the benzene. The slurry so obtained is then dissolved in 250 ml. of methyl ethyl ketone. To this solution there are added while stirring and at a temperature of about 55–60° C. 50 grams of methyl phosphonic acid ethyl ester chloride. The solution is warmed for another hour at 70° C., then cooled down to room temperature and diluted with 300 ml. of ether. The reaction product is washed three times with 200 ml. of water. After drying over sodium sulfate the solvent is distilled off. The remaining colorless, water-unsoluble oil is distilled in vacuo. There are obtained 32 grams of the new ester of the formula

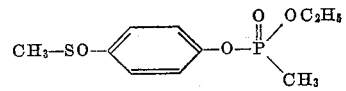

(B.P.$_{.0.01}$ 124° C.). Yield: 97% of the theoretical.

Calc. for 262.3: P=11.8%, S=12.2%, OC$_2$H$_5$=17.2%.
Found: P=10.3%, S=13.5%, OC$_2$H$_5$=16.7%.

DL$_{95}$ on rats orally 1 mg./kg.

*Example 3*

61 grams of the sodium salt of S-methyl thiohydrochinone sulfone are dissolved in 300 ml. of methyl ethyl ketone. Then there are added while stirring and at a temperature of about 30° C. 55 grams of methyl phosphonic acid ethyl ester chloride. The temperature rises slowly to about 55° C. The reaction mixture is warmed for another hour at a temperature of 60° C. Then it is cooled down to room temperature and there are added 300 ml. of chloroform. The precipitated sodium chloride is filtered off with suction. The filtrate is washed with 50 ml. of water three times. After drying over sodium sulfate the solvent is removed in vacuo. There are obtained 63 grams of the new ester of the formula

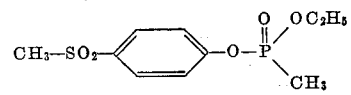

as a colorless, water-unsoluble oil. Yield: 75% of the theoretical.

Cal. for 278.3: P=11.1%, S=11.5%, OC$_2$H$_5$=16.4%.
Found: P=10.9%, S=11.6%, OC$_2$H$_5$=17.6%.

$d_4^{20}$=1.302, $n_D^{20}$=1.5260.

DL$_{95}$ on rats orally 1 mg./kg.

*Example 4*

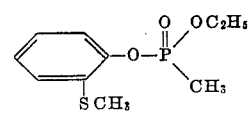

To a suspension of 51 grams of the sodium salt (0.3 mol) of S-methyl thiopyrocatechol in 250 ml. of ethyl methyl ketone there are added at a temperature of about 30° C. 50 grams of methyl phosphonic acid ethyl ester chloride. After stirring for one hour at room temperature the temperature rises to 60° C. After cooling there are added 500 ml. of benzene and the reaction mixture is washed with water. The benzenic layer is dried over sodium sulfate and the solvent is distilled off in vacuo. The remaining colorless oil is distilled in high vacuo.

There are obtained 70 grams of the new ester as a colorless oil. Yield: 94% of the theoretical.

Calc.: C = 48.77%, H = 6.14%, P = 12.60%, S = 13.02%. Found: C = 48.70%, H = 6.43%, P = 12.95%, S = 13.14%, C = 48.63%, H = 6.56%.

$d_4^{20}=1.208$ g./cc., $n_D^{20}=1.5430$.

$LD_{95}$ on rats orally 25 mg./kg.

Spider mites _____ 0.01%, 90% (ovicidal activity).
Black bean aphids ___ 0.01%, 70% (systemic action). 0.1%, 100%.

*Example 5*

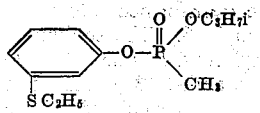

44.5 grams (0.25 mol) of the sodium salt of S-ethyl thioresorcin are dissolved in 200 ml. of ethyl methyl ketone and at a temperature of about 35–40° C. there are added 41 grams of methyl phosphonic acid isopropyl ester chloride. After heating for one hour the reaction mixture is cooled. Ether is added and this mixture is washed with water. After drying over sodium sulfate the solvent is distilled off in vacuo and the oily residue is distilled further in high vacuo. There are obtained 64 grams of the new ester (B.P. $_{0.01}$ 91° C.). Yield: 93% of the theoretical.

$d_4^{20}=1.135$ g./cc., $n_D^{20}=1.5313$.

Calc.: C = 52.54%, H = 6.98%, P = 11.30%. Found: C = 53.10%, H = 6.92%, P = 10.61%, C = 53.20%, H = 6.88%.

$LD_{95}$ on rats orally 25 mg./kg.

Spider mites _____ 0.1%, 75%.
Systemic action _____ 0.1%, 100%.
Black bean aphids _____ 0.01%, 100%.

*Example 6*

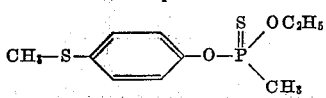

To a sodium methylate solution containing 0.2 mol of sodium there is added a solution of 28 grams of p-methyl mercapto phenol in 100 ml. of benzene. The methanol is distilled off while benzene is added so that at last there is obtained a suspension of the sodium salt in benzene. At last the benzene is distilled off in vacuo and the dry sodium phenolate is dissolved in 100 cc. of unhydrous acetone. To this solution there are added at a temperature of 20° C. 34 grams of methyl thionophosphonic acid-O-ethyl ester chloride (B.P. 12 mm./63° C.). After completion of the reaction the mixture is heated for another hour on the steam bath. The reaction mixture is diluted with benzene and then washed with water, a soda solution and once again with water. The benzenic layer is dried over sodium sulfate and the solvent is distilled off in vacuo. There are obtained 51 grams of the new ester as a light yellowish oil (B.P. $_{0.01}$ mm./102° C.).

Yield: 99% of the theoretical.

$d^{20}=1.193$, $n_D^{20}=1.5730$.

$LD_{95}$ on rats orally 2.5 mg./kg.

Colorado bettles are killed completely with solutions of 0.01%. Black bean aphids and spider mites are killed with solutions of 0.001%. The compound has a remarkable ovicidal effect against eggs of spider mites.

*Example 7*

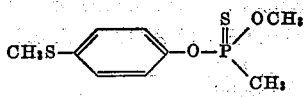

28 grams (0.2 mol) of p-methyl mercaptophenol are transformed to the sodium salt as described in Example 6 and the product is dissolved in 150 ml. of acetone. At a temperature of about 25° C. there are added 30 grams of methyl thionophosphonic acid-O-methyl ester chloride (B.P. 11 mm./53° C.). The reaction mixture is heated for another hour on the boiling water bath. Then it is worked up as described in Example 6. There are obtained 49 grams of the new ester (B.P. $_{0.01}$ mm./108° C.).

Yield: 98% of the theoretical.

$d^{20}=1.238$, $n_D^{20}=1.5887$.

$LD_{95}$ on rats orally 2.5 mg./kg.

*Example 8*

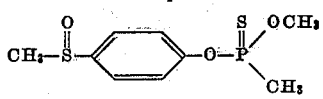

47 grams (0.3 mol) of methyl-p-hydroxyphenyl sulfoxide are dissolved in 120 ml. of ethyl methyl ketone and to this solution there are added 42 grams of potassium carbonate. After boiling for ½ hour there are added to this suspension 48 grams of methyl phosphonic acid-O-methyl ester chloride (B.P. 11 mm./53°) at a temperature of 40–50° C. After completion of the reaction the mixture is boiled for another hour and then filtered off from the salts. Then the mixture is diluted with 250 ml. benzene. This dilution is washed with a soda solution and at last with water. After drying over sodium sulfate the solvent is distilled off in vacuo. There are obtained 70 grams of the new ester (B.P. $_{0.01}$ mm./110° C.).

Yield: 88% of the theoretical.

$d^{20}=1.306$, $n_D^{20}=1.5932$.

*Example 9*

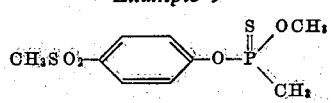

To a solution of 35 grams of methyl-p-oxyphenyl sulfone in 100 ml. of methyl ethyl ketone there are added 28 grams of finely powdered potassium carbonate. The reaction mixture is heated for half an hour and then there are added 32 grams of methyl thionophosphonic acid-O-methyl ester chloride (B.P. 11 mm./53° C.) at a temperature of 50° C. After boiling for another hour the mixture is worked up as described in Example 8. There are obtained 56 grams of a colorless crystalline product, which melts at 67° C. (from alcohol).

Density: $d^{20}=1.420$, refraction: $n_D^{65}=1.5503$.

*Example 10*

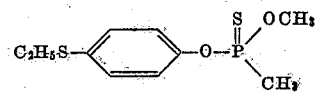

31 grams of p-ethyl mercapto phenol are transformed into the sodium salt as described in Example 6 and then dissolved in 100 ml. of acetone. To this solution there are added at a temperature of 30–50° C. 32 grams of methyl thionophosphonic acid-O-methyl ester chloride (B.P. 11 mm./53° C.) and after completion of the reaction the mixture is heated for another hour on the steam bath. Then the mixture is worked up as described in Example 6. There are obtained 52 grams of the new ester, which distils at 0.01 mm. Hg at 110° C. Yield: 98% of the theoretical.

$d^{20}=1.197$, $n_D^{20}=1.5742$.

$LD_{95}$ on rats orally 5 mg./kg.

*Example 11*

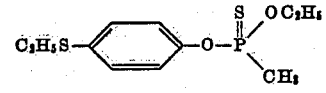

31 grams of p-ethyl mercaptophenol are transformed into the sodium salt as described in Example 6 and the sodium salt is dissolved in 100 cc. of acetone. At a temperature of 50–60° C. there are added 34 grams of methyl thionophosphonic acid-O-ethyl ester chloride (B.P. 12 mm./63° C.) and after completion of the reaction the temperature is kept at 100° C. for another hour. Then the reaction product is worked up as described in Example 6. There are obtained 55 grams of the new ester (B.P. 0.01 mm./125° C.). Yield: 98% of the theoretical.

$d^{20}=1.173$, $n_D^{20}=1.5624$.

$LD_{95}$ rats orally 10 mg./kg.

Example 12

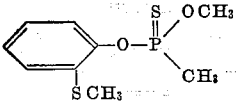

37 grams (0.26 mol) of 2-methyl mercaptophenol are transformed into the sodium salt as described in Example 6 and the sodium salt is dissolved in 120 ml. of acetone. To this solution there are added 42 grams of methyl thionophosphonic acid-O-methyl-ester chloride (B.P. 11 mm./53° C.). After completion of the reaction the reaction product is boiled for another hour. Then it is worked up as described in Example 6. There are obtained 64.5 grams of the new ester (B.P. 0.01 mm./104° C.). Yield: 99% of the theoretical.

$d^{20}=1.244$, $n_D^{20}=1.5923$.

$LD_{95}$ on rats orally 100 mg./kg.

Example 13

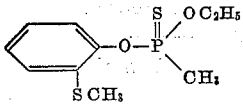

28 grams (0.2 mol) of 2-methyl mercaptophenol are transformed into the sodium salt as described in Example 6 and the sodium salt is dissolved in 100 cc. of acetone. At a temperature of 40° C. there are added 34 grams of methyl thionophosphonic acid-O-ethyl ester chloride (B.P. 12mm./63° C.). After completion of the reaction the reaction product is boiled for another hour. After working up as described in Example 6 there are obtained 52 grams of the new ester (B.P. 0.01 mm./108° C.). Yield: 98% of the theoretical.

$d^{20}=1.209$, $n_D^{20}=1.5771$.

Example 14

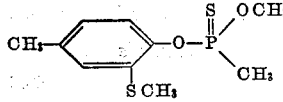

31 grams of 2-methyl mercapto-4-methyl phenol (0.2 mol) are transformed into the sodium salt as described in Example 6. The sodium chloride is dissolved in 100 cc. of acetone. At a temperature of 30–50° C. there are added 32 grams of methyl thionophosphonic acid-O-methyl ester chloride. After completion of the reaction the mixture is heated to the boiling point for another hour. After working up as described in Example 6 there are obtained 52 grams of the new ester (B.P. 0.01 mm./117° C.). Yield: 98% of the theoretical.

$d^{20}=1.217$, $n_D^{20}=1.5848$.

Example 15

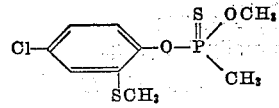

25 grams (0.14 mol) of 2-methyl mercapto-4-chlorophenol are transformed into the sodium salt as described in Example 6. The sodium salt is dissolved in 100 ml. of acetone. At a temperature of 45–50° C. there are added 23 grams of methyl thionophosphonic-acid-O-methyl ester chloride (B.P. 11 mm./53°). After completion of the reaction the reaction mixture is boiled for another hour. After working up as described in Example 6 there are obtained 39 grams of the new ester (B.P. 0.01 mm./111° C.). Yield: 99% of the theoretical.

$d^{20}=1.337$, $n_D^{20}=1.5999$.

Example 16

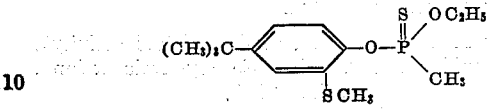

23 grams (0.09 mol) of 2-methyl mercapto-4,6-di-tert. butylphenol are transformed into the sodium salt as described in Example 6. The sodium salt is dissolved in 50 ml. of methyl ethyl ketone. At a temperature of 50–60° C. there are added 18 grams of methyl thionophosphonic acid-O-ethyl ester chloride (B.P. 12 mm./63° C.). After completion of the reaction the reaction mixture is boiled for another hour. After working up as described in Example 6 there are obtained 28 grams of the new ester (B.P. 0.01 mm./122° C.). Yield: 98% of the theoretical.

Density: $d^{20}=1.140$, refraction: $n_D^{20}=1.5575$.

We claim:

1. Phosphonic acid esters of the following formula

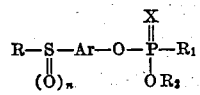

in which R and $R_1$ stand for a member selected from the group consisting of lower alkyl and phenyl radicals, Ar stands for phenyl radicals, $R_2$ stands for lower alkyl radicals, with 1 to 4 carbon atoms, X stands for a member selected from the group consisting of oxygen and sulfur, and $n$ stands for a member selected from the numbers of 0, 1 and 2.

2. Phosphonic acid esters of the following formula

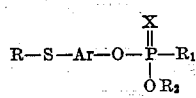

in which R and $R_1$ stand for a member selected from the group consisting of lower alkyl and phenyl radicals, Ar stands for phenyl radicals, $R_2$ stands for lower alkyl radicals, with 1 to 4 carbon atoms, X stands for a member selected from the group consisting of oxygen and sulfur.

3. Phosphonic acid esters of the following formula

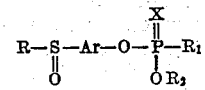

in which R and $R_1$ stand for a member selected from the group consisting of lower alkyl and phenyl radicals, Ar stands for phenyl radicals, $R_2$ stands for lower alkyl radicals, with 1 to 4 carbon atoms, X stands for a member selected from the group consisting of oxygen and sulfur.

4. Phosphonic acid esters of the following formula

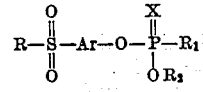

in which R and $R_1$ stand for a member selected from the group consisting of lower alkyl and phenyl radicals, Ar stands for phenyl radicals, $R_2$ stands for lower alkyl radicals, with 1 to 4 carbon atoms, X stands for a member selected from the group consisting of oxygen and sulfur.

References Cited in the file of this patent

UNITED STATES PATENTS

| | | |
|---|---|---|
| 2,503,390 | Jelinek | Apr. 11, 1950 |
| 2,803,580 | Metivier | Aug. 20, 1957 |

FOREIGN PATENTS

| | | |
|---|---|---|
| 814,152 | Germany | Sept. 20, 1951 |